W. N. GOLDHAMER.
SIMMERING BURNER.
APPLICATION FILED SEPT. 3, 1910. RENEWED SEPT. 16, 1911.
1,007,863.
Patented Nov. 7, 1911.
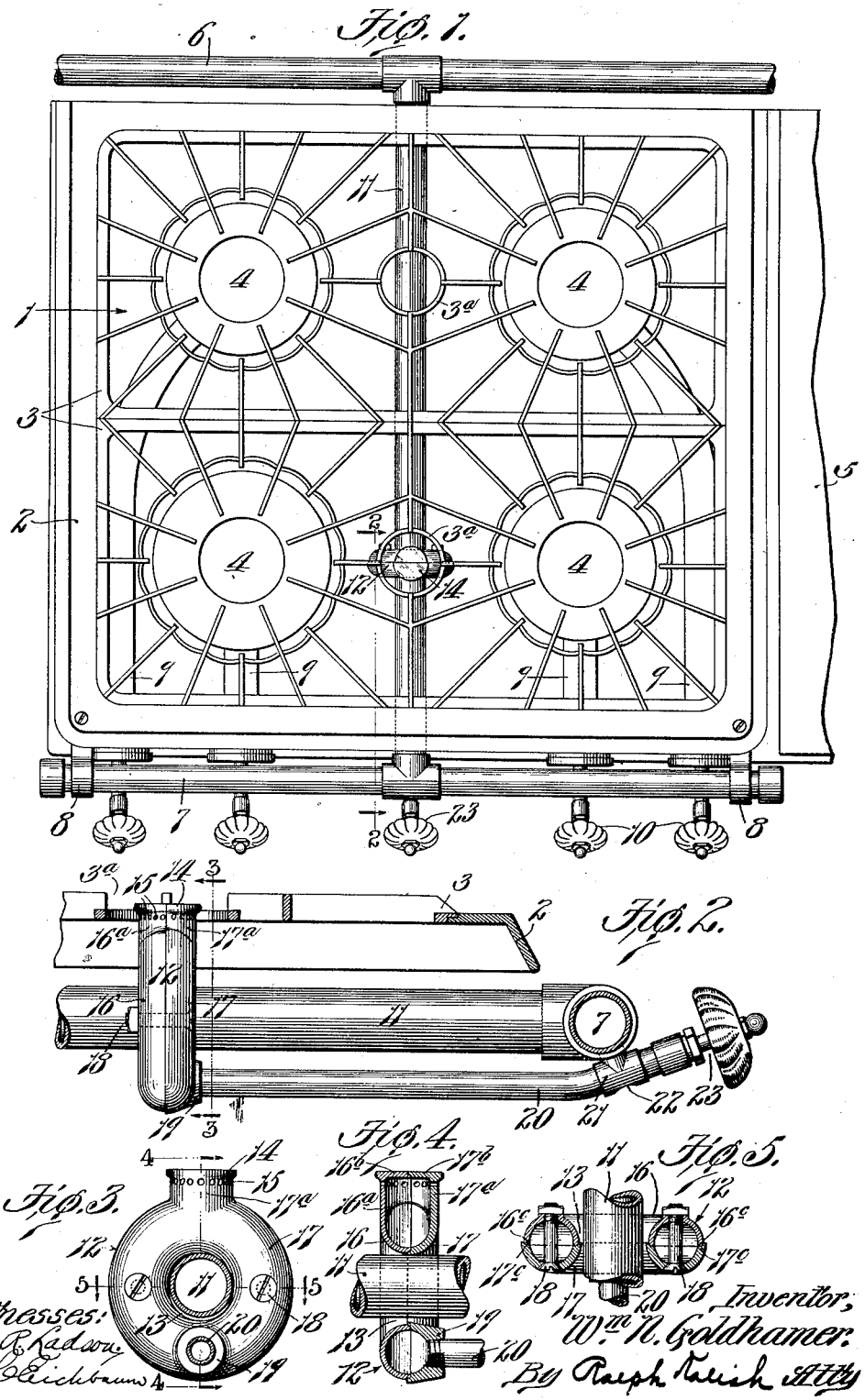

UNITED STATES PATENT OFFICE.

WILLIAM N. GOLDHAMER, OF ST. LOUIS, MISSOURI.

SIMMERING-BURNER.

1,007,863.  Specification of Letters Patent.  Patented Nov. 7, 1911.

Application filed September 3, 1910, Serial No. 580,376. Renewed September 16, 1911. Serial No. 649,734.

*To all whom it may concern:*

Be it known that I, WILLIAM N. GOLD-HAMER, a citizen of the United States, residing at the city of St. Louis, State of Missouri, have invented a certain new and useful Simmering-Burner, of which the following is a specification, reference being had to the accompanying drawings, forming a part hereof, in which—

Figure 1 is a top plan view of a portion of a gas-stove, showing the open-cooking-portion thereof and my new simmering-burner in operative position thereon; Fig. 2 is a sectional view, somewhat enlarged, on the line 2—2, Fig. 1; Fig. 3 is a sectional view on the line 3—3, Fig. 2; Fig. 4 is a sectional view on the line 4—4, Fig. 3; and Fig. 5 is a sectional view on the line 5—5, Fig. 3.

This invention relates to a certain new and useful improvement in simmering-burners, the objects of my invention being to provide a burner of the kind stated which is simple in construction, which may be manufactured at comparatively cheap cost, and which may be easily and readily arranged and supported in operative position, and to improve generally upon burners of the kind described.

With these objects in view, my invention resides in the novel construction of the several parts of my burner and in the novel arrangement and combination of the same, all as will hereinafter be described and afterward pointed out in the claims.

My new burner is especially adapted for use in connection with gas-ranges and the like, and in the drawings, wherein like reference-numerals refer to like parts throughout the several views, I have shown my burner in operative position on a gas-range of approved construction, 1 indicating the open-cooking-portion of such gas-range, 2 the open top-plate provided with the usual cooking-utensil supporting-portions 3 over and around the usual burners 4, 5 the oven portion (partly shown), 6 a gas-supply pipe communicating with, and leading from, a suitable source of gas-supply, 7 a gas-pipe suitably mounted, as by brackets 8, at the front of said portion 1, 9 suitable supply-pipes leading from said pipe 7 to said burners 4, the supply of gas through said pipes 9 to said burners 4 being regulated or controlled, as is usual, by suitable valves 10, and 11 a suitable pipe extending under said plate 2 and communicating with, and being suitably connected to, said pipes 6 and 7. 12 indicates my new simmering burner. This burner is hollow or tubular and substantially ring or doughnut-shaped, having preferably an open center, as at 13, and having a hollow cylindrical portion 14 closed at its outer end and provided with preferably an annular or circular series of gas-outlet-perforations 15 therearound and preferably adjacent the closed outer end thereof extending outwardly from its periphery, as shown particularly in Figs. 3 and 4. Burner 12 comprises preferably two ring-shaped or annular members or sections 16 and 17 concaved or substantially semi-circular in cross-section held operatively together by any suitable means, as by screws or bolts 18 passing therethrough, as shown particularly in Fig. 5. Both of said sections are provided, respectively, with concaved or substantially semi-cylindrical portions 16$^a$ and 17$^a$ extending outwardly from their periphery, these portions 16$^a$ and 17$^a$ meeting at their edges and having, respectively, meeting outer end walls 16$^b$ and 17$^b$ and forming together said hollow cylindrical portion 14. One of said sections, as, for instance, section 17, see particularly Figs. 3 and 4, is provided preferably with a perforated boss or thickened portion 19 providing a gas-inlet opening for the burner and in which is adapted to be threaded one end of a short section of gas-supply pipe or tubing 20. Section 17 is also preferably somewhat thicker than section 16, the outer diameter of section 17 being somewhat greater than the outer diameter of section 16, and, at its rim, as shown particularly in Fig. 5, is preferably recessed or grooved, as at 17$^c$ to provide a seat for the rim of section 16. If required, the rim of section 16 may be cut-away or beveled, as at 16$^c$, so that said sections may fit tightly and evenly together. As shown particularly in Figs. 2, 3, and 4, when burner 12 is in operative position, its said supply-pipe 20 is preferably connected to said pipe 7 by, and communicates therewith through, a suitable member or coupling 21. Said coupling-member 21 and said pipe 20 are preferably provided with a suitable air-inlet opening, as at 22, and a suitable valve 23 arranged in the other or forward end of said pipe 20 is adapted to regulate the supply of gas through said pipe 20 to the burner 12.

The burner 12 is adapted to be loosely supported in operative position relative to a suitable cooking-utensil portion 3ª in plate 2 by means, for instance, of said pipe 11 passing through the open center 13 thereof. When, however, said pipe 20 is connected to said pipe 7, as by said coupling member 21, the burner 12 will be held firmly in operative position relative to said plate 2.

The sections 16 and 17 of my burner are preferably made of cast metal, which is durable and lasting, but they may be made of other material, if desired, for it will be seen that should said sections or other parts of my burner become damaged or worn, the same may be readily replaced; and it will also be seen that my burner may be easily and quickly arranged and held in proper operative position and is very simple in construction.

My burner may be made of any size desired and other minor changes in the arrangement, construction, and combination of the several parts of my burner may be made and substituted for those herein shown and described without departing from the nature and principle of my invention.

Having thus described my invention, what I claim and desire to secure by Letters Patent is:

1. A substantially ring-shaped tubular simmering-burner having a gas-inlet opening and a hollow cylindrical portion extending outwardly from its periphery, said portion being closed at its outer end and having a series of gas-outlet perforations therearound; substantially as described.

2. A simmering-burner comprising a plurality of annular sections substantially semicircular in cross-section, operatively connected and forming a ring-shaped tube, one of said sections being provided with a gas-inlet opening and each of said sections being provided with gas-outlet perforations; substantially as described.

3. A simmering-burner comprising two coöperating concaved ring-shaped sections, one of said sections being provided with a gas-inlet opening and both of said sections being provided with outwardly-extending portions having gas-outlet perforations; substantially as described.

4. A simmering-burner comprising two coöperating concaved ring-shaped sections, one of said sections being provided with a gas-inlet opening and both of said sections being provided with outwardly-extending semi-cylindrical portions meeting at their edges and having meeting end-walls and gas-outlet perforations; substantially as described.

5. A simmering-burner comprising two coöperating concaved ring-shaped sections, one of said sections being provided with a gas-inlet opening and both of said sections being provided with outwardly-extending semi-cylindrical portions meeting at their edges and having meeting end-walls and gas-outlet perforations, and one of said sections being provided in its rim with a recess or groove in which the other of said sections is adapted to fit; substantially as described.

6. A simmering-burner comprising two coöperating concaved ring-shaped sections, one of said sections being provided with a gas-inlet opening and both of said sections being provided with outwardly-extending semi-cylindrical portions meeting at their edges and having meeting end-walls and gas-outlet perforations, and one of said sections being provided in its rim with a recess or groove in which the other of said sections is adapted to fit, and means adapted to operatively hold said sections together; substantially as described.

7. A tubular substantially doughnut-shaped simmering-burner adapted to be supported in operative position by means of a pipe passing through the open center thereof and having on opposite sides of the open center thereof a gas-inlet opening and an outwardly-extending hollow cylindrical portion provided with gas-outlet perforations; substantially as described.

In testimony whereof, I have signed my name to this specification in the presence of two subscribing witnesses.

WILLIAM N. GOLDHAMER.

Witnesses:
 GEO. C. EICHBAUM,
 CAROLINE L. WEBER.

---

Copies of this patent may be obtained for five cents each, by addressing the "Commissioner of Patents, Washington, D. C."